United States Patent Office 3,429,524
Patented Feb. 25, 1969

3,429,524
ATTITUDE CONTROL SYSTEM
Arthur G. Buckingham, Baltimore, and Thomas P. Haney, Sykesville, Md., assignors to Westinghouse Electric Corporation, Pittsburgh, Pa., a corporation of Pennsylvania
Filed July 19, 1965, Ser. No. 472,952
U.S. Cl. 244—1                          3 Claims
Int. Cl. B64c 19/00

ABSTRACT OF THE DISCLOSURE

A satellite attitude control is described in which a single inertia wheel is mounted for rotation about a fixed spin axis coinciding with the pitch axis of the satellite. The inertia wheel is part of a motor-inertia-wheel-tachometer generator unit fixedly mounted on the satellite. As the satellite vehicle orbits the earth, the vehicle will be stabilized about the roll and yaw (X and Z axes, respectively) axes by the inertia wheel. Variation of the speed of rotation of the inertia wheel about the pitch axis stabilizes the vehicle about the latter axis. For the usual satellite application the satellite is stabilized with the yaw axis along the geocentric axis of the earth by the spinning inertia wheel. Disturbance torques about both the yaw and the roll axes of the vehicle will tend to precess the spin axis, that is, the pitch axis. Disturbance torque about the pitch axis will tend to increase or decrease the inertia wheel speed. An electromagnetic actuation system generates reaction torques with the earth's magnetic field which tends to keep the wheel speed constant and remove the precession of the inertia wheel axis. It is obvious that if a net disturbance torque exists around the pitch axis the wheel will continually change speed to overcome the disturbance torque. Eventually, therefore, the wheel will reach its maximum possible speed and will not be able any longer to counter the disturbance. The tachometer attached to the wheel senses when this condition is taking place and supplies appropriate signals to the coil current computers to inject the appropriate currents into the appropriate coils to remove the excess momentum in the pitch axis. In order to remove this momentum, the vehicle must be able to determine the strength and direction of the earth's magnetic field. This is done by a three axis magnetometer which measures the components of the earth's field in the principal axis of the vehicle.

---

This invention relates to an attitude control system for satellite vehicles.

This invention is particularly directed to an attitude control system for communication, navigation or meteorological satellite which do not require the degree of attitude control precison that is necessary for certain observatory type satellite vehicles. Various systems for providing attitude control for satellite vehicles are known. In some systems mass dispensing means are provided for dumping the momentum of the vehicle. In other systems a natural force control scheme is used through which the unwanted momentum about the respective orthogonal axes is dumped to the earth through the flux of the earth's magnetic field. In still other systems an inertia wheel is provided for each orthogonal axis in association with means for absorbing the unwanted momentum of the satellite and then through a suitable control system the momentum stored in the inertia wheels is dumped to the magnetic field of the earth's magnetic flux. A system of the latter general category is described and claimed in copending application Ser. No. 214,884, for Control Apparatus, filed Aug. 6, 1962, in the names of Arthur G. Buckingham, Thomas P. Haney, John W. Knight and David W. Reese, now Patent 3,189,298, dated June 15, 1965.

In the publication, Navigation, for spring 1958, pages 66 to 71, inclusive, in an article entitled "Attitude Control Techniques" observations are made about certain attitude control systems, one of which uses two inertia, or torque, wheels in a system in which deviations from the reference attitude are sensed and measured by rate gyros. In that system outputs from the sensors are processed by a damping computer to supply the proper signal to the torque generating mechanism to correct the attitude of the vehicle with respect to the frame of reference which is a celestial body about which the vehicle is orbiting. In one of the systems proposed in that article there is a combination of two inertia wheels with a system of jets through which the excess momentum is dumped. A disadvantage of a mass dispensing system for dumping the torque, of which a jet system is one type, is that such systems have limited life due to the consumption of fuel which must be stored on the craft. Furthermore, such systems usually provide low torque levels thus limiting the utilization of the forces. Accordingly, it is a primary object of the present invention to provide a new and improved space vehicle attitude control system which provides high torque levels and a long life.

Another object of the invention is to provide a simplified attitude control system which eliminates the necessity of a momentum dumping system of the mass dispensing type.

Another object is to provide a novel and improved attitude control system which uses the combination of a torque generating system in which the excess momentum can be dumped to the earth through the earth's magnetic field.

The invention itself, however, both as to its organization and method of operation as well as additional objects and advantages will best be understood from the following description when read in connection with the accompanying drawing, in which.

Figure 1:
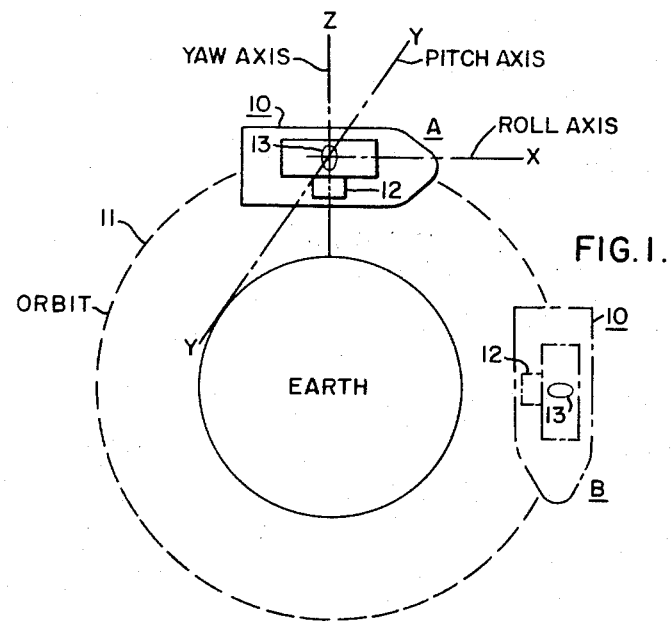
FIGURE 1 is a symbolic illustration of a satellite attitude control system in accordance with the present invention.

Briefly, the present invention provides a space vehicle attitude control system in which a single inertia wheel is mounted for rotation about a fixed spin axis on the vehicle. The inertia wheel is part of a motor-inertia-wheel-tachometer generator unit, hereinafter referred to as the inertia wheel, adapted to have its spin axis perpendicular to the orbital plane and coinciding with the pitch axis of the vehicle. As the satellite vehicle orbits the earth, the vehicle will be stabilized about the roll and yaw (X and Z axes, respectively) axes by the inertia wheel.

For earth satellite applications the attitude requirements dictate that the yaw, or Z, axis of the vehicle be oriented along the local geocentric vertical and the roll, or X axis of the vehicle be oriented parallel to the orbital plane and the pitch axis (Y axis) be perpendicular to the orbital plane. Accordingly, as the space vehicle orbits the earth disturbance torques about both the yaw and the roll axes of the vehicle will tend to precess the spin axis, that is, the pitch axis. Disturbance torque about the pitch axis will tend to increase or decrease the inertia wheel speed. An electromagnetic actuation system generates reaction torques with the earth's magnetic field which tends to keep the wheel speed constant and remove the precession of the inertia wheel. The system is very simple, it does not require rate gyros and there is only one inertia-wheel-motor-tach unit required.

In all space vehicle guidance systems there is a need for some frame of reference with respect to which changes in attitude can be sensed. In addition some means is necessary to produce a torque to change the momentum and position of the vehicle. Where it is desired only to maintain a constant attitude with respect to one celestial body such as the earth, a system utilizing three mutually perpendicular magnetic torquing coils may be energized in response to appropriate signals to develop a resultant magnetic field which interacts with the earth's magnetic field to provide predetermined torque on the space vehicle. This type of system might be considered analogous to the steering of a boat by the use of small anchors suspended from outriggers on a boat. Such a system is disclosed in the aforementioned copending patent application and is used in conjunction with the present invention.

Where it is desired to substantially change the angular momentum of the vehicle for the purpose of changing the orientation of the attitude of the space vehicle it is necessary to have additional torque producing means, such as a mass dispensing system or the inertia wheels in systems such as those described in said aforementioned patent application and publication. In the latter type system means must be provided for transferring the excess momentum from the wheels to the earth's magnetic field through mutually perpendicuar magnetic torquing coils. The system of the present invention provides a control system including a single inertia wheel with suitable sensing means, such as an infrared horizon scanner and a yaw angle sensor, to produce a fixed reference point with respect to which the X–Y plane is determined.

It is believed appropriate to facilitate an understanding of the present invention to continue with the complete general description and philosophy of operation after which the components and their related operations will be identified in greater detail.

Before launch, the inertia wheel, whose spin axis is fixed with respect to the vehicle and which in orbit will be oriented perpendicular to the orbital plane, is spun up to some nominal speed, thereby stabilizing the vehicle in two axes. After injection of the vehicle into orbit, the wheel speed is decreased, thereby causing a rotation of the vehicle about its pitch axis which is coincident with the wheel spin axis. The spinning wheel, however, still maintains stabilization in the yaw and roll axes. As the vehicle slowly rotates about its pitch axis, it eventually will cause the IR horizon scanner to encounter the earth's disc. When this occurs, the horizon scanner generates a signal telling the vehicle to decrease its rate of rotation by speeding up the wheel. If the vehicle does not stop by the time the yaw axis is coincident with the local vertical, the horizon scanner will cause the wheel to speed up even more which generates a greater reaction torque on the vehicle causing it to stop rotating and reverse its direction thereby driving the horizon scanner, and therefore, the vehicle yaw axis to become aligned with the local vertical. As the vehicle orbits the celestial body, if its pitch rotation is exactly zero with respect to inertial space, the horizon scanner will again see a pitch error and cause the vehicle to rotate slowly in space at a rate which just equals the vehicle orbital rate about the celestial body, thus keeping the yaw axis and horizon scanner aligned with the local vertical.

If a net disturbance torque exists around the pitch axis, the wheel will continually change speed to overcome the disturbance torque. Eventually, therefore, the wheel will reach its maximum possible speed and will not be able any longer to counter the disturbance. The tachometer attached to the wheel senses when this condition is taking place and signals the coil current computers to inject the proper currents into the appropriate coils to remove the excess momentum in the pitch axis. In order to remove this momentum, the vehicle must be able to determine the strength and direction of the earth's magnetic field. This is done by a three axis magnetometer which measures the components of the earth's field in the principal axis of the vehicle. A moment's reflection, however, will make clear that unless the earth's field is completely coincident with one of the vehicle's principal axis, torques will be produced in two or all three axes of the vehicle. These amount to errors in at least one of the axes which must be removed by the control system appropriate to that axis.

The IR horizon scanner also controls roll angle errors. This is done in a manner different from the scanner control in pitch. For example, if a roll angle error exists, a torque about the roll axis is desired to counter the roll angle error. If the torque is applied directly around the roll axis, however, a yaw error will result because of the law of precession. Therefore, a torque about the yaw axis is generated by injecting a current into the coils in the pitch and roll axes to react with the earth's field components in these axes. If a net disturbance exists in the roll axis, it is necessary to maintain current in the coils in the pitch and roll axes which exactly counters the disturbance. The magnetometer continually measures the earth's field components and, for small angles, the roll angle is proportional to the yaw component of momentum, so that the current in the appropriate coils can be continually changed to obtain the maximum torque required to counter the disturbance.

The yaw axis control is achieved in exactly the same manner as is the roll axis control except a yaw angle sensor is used instead of the horizon scanner and the actuation coils used are the yaw and pitch instead of the roll and pitch.

It should be noted that for both the roll and yaw axes, the control wheel did not enter into the control system, either for actuation or for momentum dumping. The unwanted momentum is transferred from the vehicle roll and yaw axes directly through the actuator coils reacting with the earth's field.

The spinning wheel simply offers a convenient means for supplying natural stabilizing forces in the roll and yaw axes.

Figure 2:
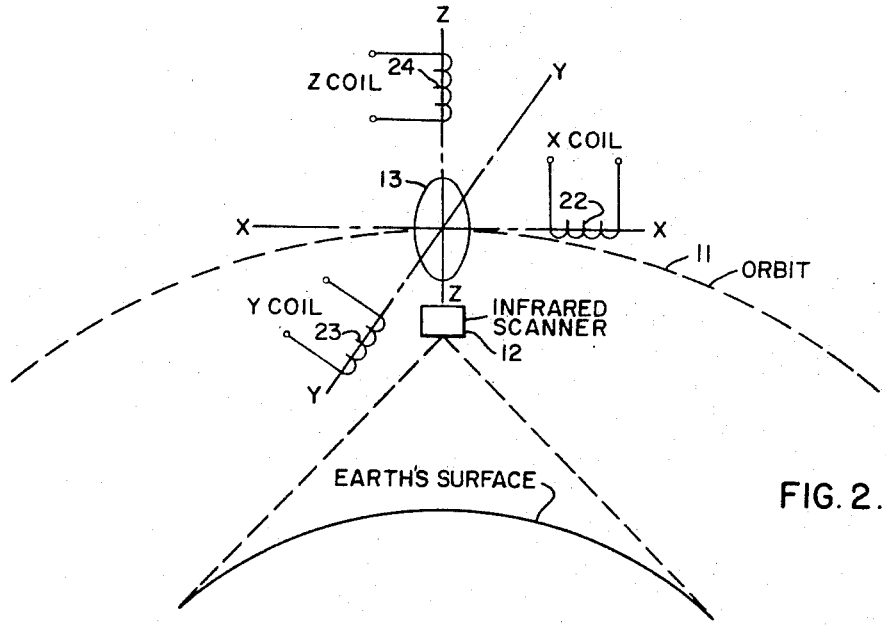
FIG. 2 is a symbolic representation, on a larger scale than that of FIG. 1, showing the position and attitude of a controlled satellite and illustrating the relative position of the axis of rotation of a single inertia wheel and the infrared scanner.
Figure 3:
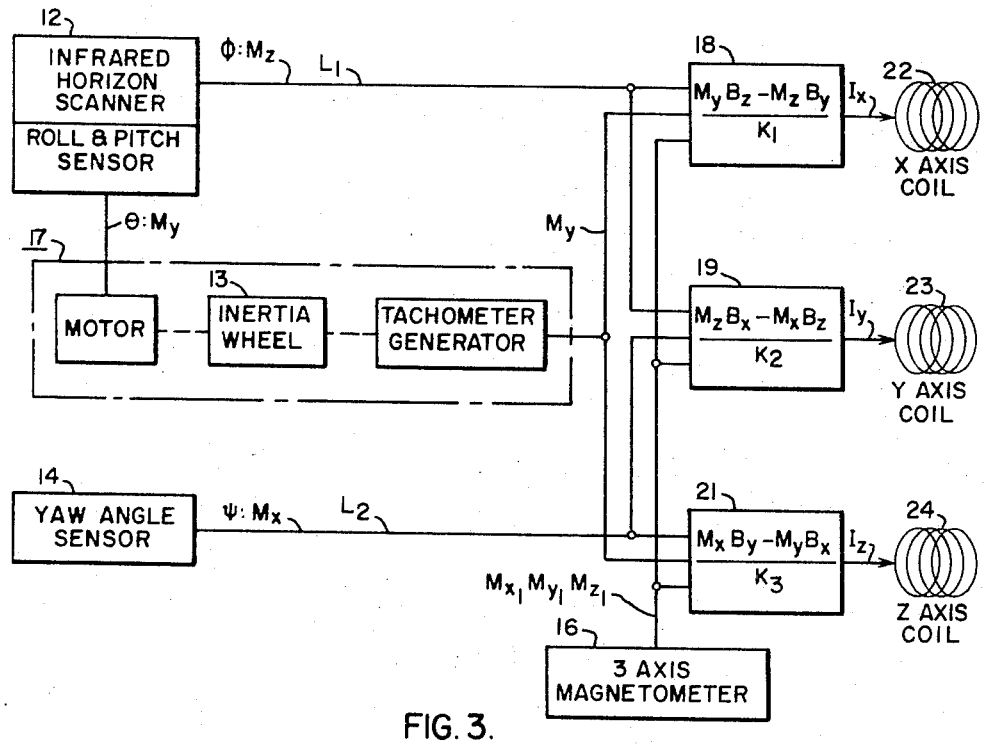
FIG. 3 is a schematic diagram of the space vehicle attitude control system in accordance with the present invention.

Referring now to FIG. 1 of the drawings, the manner in which the attitude of an earth satellite is fixed is illustrated wherein a space vehicle 10 is moving in an orbit 11 about the earth and is provided with a suitable infrared sensor 12 which constantly points to the geocenter of the earth. A single inertia wheel, indicated schematically at 13, spins about the Y, or pitch axis which is perpendicular to the plane of the orbit 11. This is schematically illustrated in FIG. 2 on a larger scale, together with the orthogonally disposed torquing coils through which corrective torques are applied to the vehicle about the X and Z axes and through the pitch coil of which unwanted momentum of the inertia wheel is dumped to the earth through the earth's magnetic field.

It will be apparent that the magnitude of the torque developed on the vehicle by the torquing coils is limited by the magnitude of the earth's magnetic field since this field diminishes with the inverse cube of the distance of the space vehicle from the center of the earth. However, it is found that sufficient torques of the order of 1 ounce-inch are possible at distances from the earth in excess of 3,000 miles. Since the lines of the magnetic flux of the earth pass between the North and South Pole it will be apparent that it will be necessary to constantly vary and maintain the proper relation between the current in the three torquing coils in order to maintain the desired attitude of the space vehicle.

In the single wheel attitude control system of the present invention, in addition to the infrared horizon sensor 12, a yaw angle sensor 14 which may be of conventional construction, and a 3-axis magnetometer 16 are provided to develop signals which are processed to provide control signals for the three orthogonal control coils, or torquing coils, hereinafter described. In this system, as distinguished from the system described and claimed in the aforementioned pending application using three inertia wheels, the single inertia wheel 13 spinning on the Y—Y axis perpendicular to the orbital plane causes the vehicle to be stabilized about the X and Z axes while the stabilization of the vehicle about the Y-axis, that is, the pitch axis, will be controlled by the operation of the inertia wheel 13. As the vehicle 10 orbits the earth, disturbance torques about the pitch axis Y—Y will tend to increase or decrease the inertia wheel speed. An electromagnetic actuation system is provided to generate the necessary reaction torque with the earth's magnetic field through which undesired momentum of the vehicle is dumped to the earth in order that the single inertia wheel 13 will be capable of continuing to exercise stabilizing control. This electromagnetic actuation system also provides the necessary reaction torque on the vehicle to correct any disturbance torques about the X and Z axes, respectively.

For this purpose, computer units 18, 19 and 21, of conventional design and constituting multiplying and summing devices, under the conjoint action of the sensors 12, 14 and 16, cause the generation of currents which determine respectively, the magnetic fields of the torquing coils 22, 23 and 24 whose axes are along the X, Y and Z axes respectively, and produce corresponding magnetic field components along these axes. The resultant of these components reacts with the resultant of the earth's local magnetic field vector to provide the necessary stabilization of the vehicle.

In general, the philosophy of the electromagnetic actuation system for effecting stabilization of the space vehicle is the same as disclosed in the aforementioned patent application.

As is well understood, in a space vehicle operating within a few thousand miles of the earth's surface it may be considered that the earth's field is of constant magnitude and direction when considering time intervals of only several seconds. Therefore, if a current carrying coil were placed in this field a torque would act on the coil in accordance with the principles well understood and similar to that of a d'Arsonval galvanometer. When three coils have their axes disposed along the respective orthogonal axes as indicated in FIG. 2, appropriate currents applied to the coils can produce a resultant field directed in any direction and of any magnitude. The torque which would be generated by the reaction of the vector sum of the coil fields with that of the earth's magnetic field vector B may be expressed $$\vec{T} = K_2 \vec{B} \times \vec{I}$$

where $K_2$ is a constant.

The torque $T$ is always in a plane perpendicular to the earth's field B. By the adjustment of the relative values of the current $I_x$, $I_y$, $I_z$, in the orthogonal coils the direction of the resultant torque may be varied to lie anywhere in the plane perpendicular to this field vector B in order to get the desired reaction on the vehicle.

The currents which are supplied to the three coils 22, 23, 24 to provide the desired field to react with the earth's field may be derived from the following equation which is the general vector equation relating the momentum of the system, the earth's magnetic field and the field coil current, $$\vec{I} = \frac{\vec{M} \cdot \vec{B}}{H|B|^2}$$

where M is the angular momentum of the vehicle, and H is a factor which is a function of the change of the earth's field strength and direction with latitude and longitude. The value of $|B|^2$ is substantially constant for a given altitude. Solving this equation for the three currents in each of the coils gives $$I_x = M_y B_z - M_z B_y$$
$$I_y = M_z B_x - M_x B_z$$
$$I_z = M_x B_y - M_y B_x$$

where $I_x$, $I_y$, $I_z$ are the currents in the respective coils 22, 23 and 24; $B_x$, $B_y$, $B_z$ are the components of the earth's magnetic field, $M_x$, $M_y$, $M_z$, are the unwanted components of the momentum of the vehicle; and $K_x$, $K_y$, $K_z$ are constants. The ability to continuously reduce the total momentum stored in the vehicle depends upon the continuous change in direction of the earth's field vector with respect to the momentum vector of the vehicle.

The three-axis-magnetometer 16 provides signals $B_x$, $B_y$ and $B_z$ which are respectively proportional to the vector components of the earth's magnetic field along the X, Y and Z axis respectively. These signals are supplied, respectively, to the computers 18, 19 and 21. The infrared horizon scanner and roll and pitch sensor 12 provides a signal $M_z$, proportional to the roll angle $\phi$ over the lead $L_1$ to computer units 18 and 19 and at the same time provides a signal $M_y$ which is proportional to the pitch angle $\theta$ to the motor for the inertia wheel component 17 so that the tachometer generator of that component produces an output signal to the respective computer units 18 and 21. The yaw angle sensor 14 produces a signal $M_x$, proportional to the yaw angle $\psi$, which is supplied to the computer units 19 and 21 over lead $L_2$.

Figure 4:
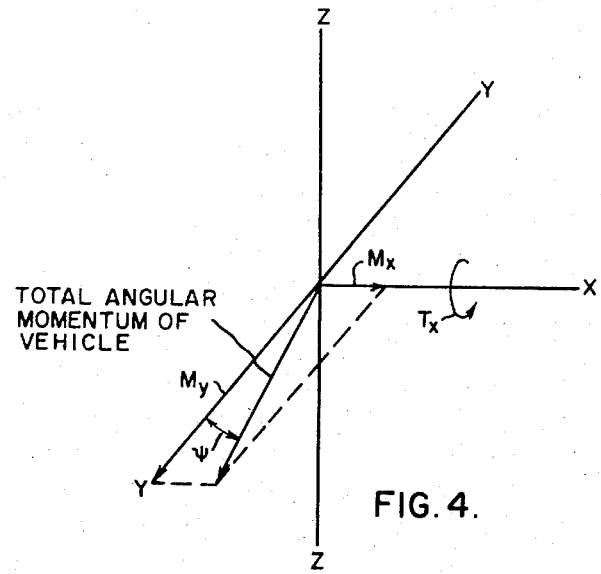
FIG. 4 is a vector diagram illustrating the relation between the angular momentum of the inertia wheel and the angular momentum of the vehicle about the Y-axis to keep the Z-axis directed along the local vertical.

In the operation of this device the inertia wheel 13 in the motor-inertia wheel-tachometer generator unit 17 is spun up to provide the inertia stabilization in the roll axis X—X and the yaw axis Z—Z. The initial pitch angular rate of the vehicle 10 about the Y—Y axis is determined by reducing the speed of the inertia wheel 13 by a fixed amount at its instant of launch. The pitch rate about the Y—Y axis will be the desired search rate for the infrared scanner sensor 12 in erecting it to the earth's local vector. When the sensor 12 senses and locks on the earth, the angular rate of the wheel 13 is subsequently controlled directly by the infrared scanner 12. A pitch disturbance torque will cause the wheel 13 speed to either increase or decrease. A roll disturbance torque will cause a yaw angle error and conversely a yaw disturbance torque will cause a roll angle error due to the inertial cross coupling between these axes. As shown in the circuit diagram in FIG. 4 the angular momentum of the vehicle necessary to keep the Z-axis directed along the local vertical is represented by $M_y$ which is due to the angular momentum of the wheel 13. When a roll disturbance $T_x$ acts on the vehicle generating a small component of angular momentum $M_x$, the total momentum of the vehicle becomes the vector sum of $M_x$ and $M_y$. And for small angles, that is, those angles less than 10° the yaw angle $\psi$ is proportional to the roll angular momentum error. Similarly by measuring the roll angle precessions, signal proportional to yaw angle momentum errors are produced.

As was mentioned above the direction and magnitude of the earth's magnetic field is continuously changing with respect to the momentum vector of the vehicle. Accordingly, when the signals representing momentum vector of the vehicle are cross multiplied with the signals representing vector components of the earth's magnetic field in the computer units 18, 19 and 21 the cross products are produced, the analogs of which are the respective currents $I_x$, $I_y$ and $I_z$ supplied to the coils 22, 23 and 24 to correct the attitude of the vehicle. While this process is taking place any excess momentum developed in the inertia wheel 13 due to its net increase in speed will be transferred through the electromagnetic actuation system to the earth through the interaction between the fields of the respective coils 22, 23 and 24 and the earth's magnetic field.

We claim as our invention:

1. Attitude control system for an orbiting space vehicle comprising, inertia-wheel means mounted on a spin axis fixed to said vehicle, said spin axis coinciding with the pitch axis of said vehicle and perpendicular to the orbital plane, means for providing a first set of signals proportional to the orthogonal components of the earth's magnetic field at the vehicle in the roll, pitch and yaw axes, respectively, means for imparting a selected angular momentum to said inertia-wheel about said spin axis for providing a zero frame of reference for angular momentum about said spin axis and simultaneously providing roll and yaw axis zero orientation for said vehicle, means for imparting a rate of rotation about said spin axis equal to its rate of orbital revolution, means for providing a first momentum signal proportional to the angular momentum vector representing the deviation of said rate of rotation of said vehicle about said spin axis, means for supplying said first momentum signal to said inertia-wheel means for correcting said deviation, means for providing second and third momentum signals proportional to the angular momentum vectors representing the deviations of said vehicle from zero orientation about said roll and yaw axes, respectively, means for providing a second set of signals representing the cross products of said earth's magnetic field vectors and said momentum vectors and means for producing magnetic field vectors representing said cross products to provide resultant magnetic field vectors to react with the earth's magnetic field for transferring unwanted momentum from said wheel and for providing torques to correct said roll and yaw deviations.

2. The combination as set forth in claim 1, in which said inertia-wheel means includes a tachometer generator driven by said wheel for providing said first momentum signal proportional to the angular momentum of said wheel about the pitch axis, yaw sensor means for providing said second momentum signal proportional to the angular momentum of said vehicle about the roll axis, roll-pitch horizon sensor means for providing signals proportional to the angular momentum about the yaw axis and pitch axis, and a three-axis magnetometer for providing said first set of signals, respectively.

3. The combination as set forth in claim 1, in which said control system comprises a three-axis magnetometer for providing said first set of signals, said inertia-wheel means includes a driving motor and a tachometer generator which provides said first momentum signal to keep the yaw axis at a selected orientation, and in which said magnetic means comprises three orthogonally disposed coils fixedly mounted on said vehicle with their axes, coinciding, respectively, with the roll, pitch and yaw axes of said vehicle.

References Cited

UNITED STATES PATENTS

| | | | |
|---|---|---|---|
| 2,963,243 | 12/1960 | Rothe | 244—1 |
| 3,048,108 | 8/1962 | Robertson et al. | 244—1 X |
| 3,061,239 | 10/1962 | Rusk | 244—1 |
| 3,189,298 | 6/1965 | Buckingham et al. | 244—1 |
| 3,228,628 | 1/1966 | Chubb | 244—1 |

FERGUS S. MIDDLETON, *Primary Examiner.*